United States Patent [19]  
Mizuhara et al.

[11] 3,786,854  
[45] Jan. 22, 1974

[54] METHOD OF MAKING BRAZING ALLOY

[75] Inventors: Howard Mizuhara, San Mateo; Nicholas T. Gamer, Palo Alto, both of Calif.

[73] Assignee: Western Gold & Platinum Company, Belmont, Calif.

[22] Filed: Mar. 1, 1972

[21] Appl. No.: 230,794

[52] U.S. Cl. ............... 164/80, 29/420, 29/521.2, 164/87
[51] Int. Cl. ............................................. B22d 11/06
[58] Field of Search ...... 164/80, 87, 131, 86; 29/18, 29/521.1, 521.2, 420; 75/20 R, 20 F; 266/3R; 134/15

[56] References Cited
UNITED STATES PATENTS
3,091,558   5/1963   Shay .................................... 134/15
3,433,632   3/1969   Elbert et al ...................... 75/20 F X
3,310,870   3/1967   Parikh et al. .................. 29/527.2 X Primary Examiner—Robert D. Baldwin
Attorney, Agent, or Firm—Norman J. O'Malley et al.

[57] ABSTRACT

A method of making a substantially pure brittle brazing alloy in solid form such as sheet or strip consists of forming a paste with an atomized or mechanically powdered alloy and an organic vehicle, continuously applying the paste at a uniform predetermined thickness to a metallic substrate, thermally expelling the organic vehicle from the alloy layer, melting the alloy granules without melting the substrate, and chemically or otherwise removing the substrate. The method preferably is practiced with a continuously moving line which begins with a supply roll of the substrate and ends with a roll of the pure brazing alloy in strip form. This alloy strip may thereafter be blanked or otherwise formed into desired shapes for use as brazing inserts.

3 Claims, 1 Drawing Figure

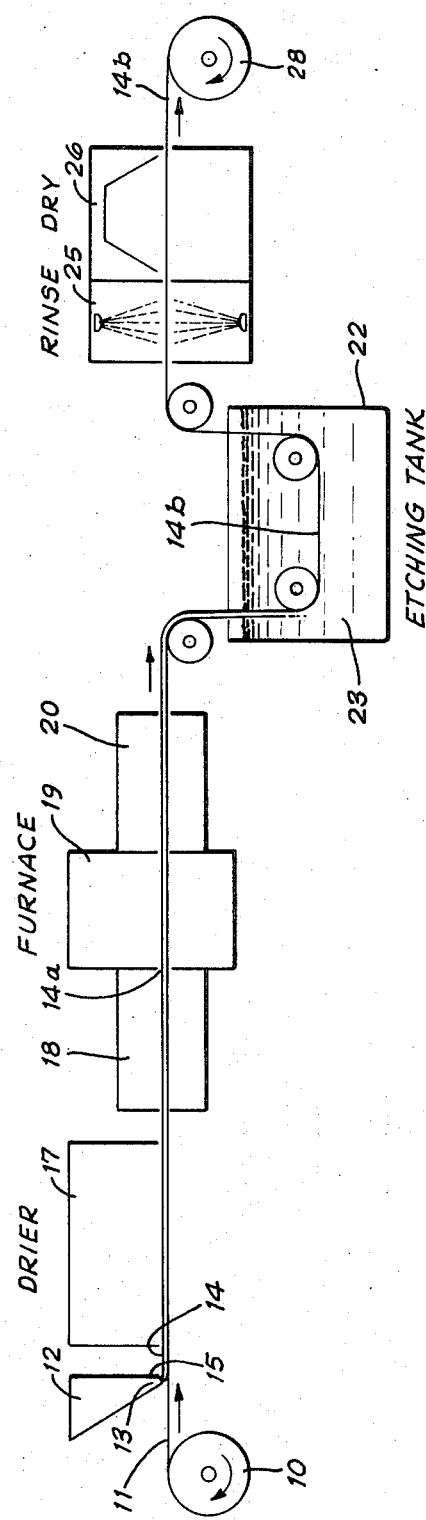

METHOD OF MAKING BRAZING ALLOY

BACKGROUND OF THE INVENTION

This invention relates to an improved method of making a brazing alloy in sheet form.

Certain brazing alloys such as AMS 4779 (consisting principally of nickel, silicon and boron) described in Aerospace Material Specifications published June 30, 1960 by Society of Automotive Engineers, Inc. are extremely hard and brittle and therefore cannot readily be cold worked into suitable form, such as wire or strip, for placement in a metal joint to be brazed. In the past, such brazing alloys have been formed by grinding or atomizing the elements into a powder and mixing the powder with a suitable organic binder which holds the powder granules together in strip or wire form convenient for handling and placement. The disadvantage of brazing alloys in this form is that the organic binder on heating decomposes and gives off gases which, if evolved too rapidly, can displace or "blow away" some of the metallic brazing alloy powder. Since the brazing operation is commonly performed in hydrogen or argon or in a vacuum, the decomposition of the organic binder is seldeom if ever complete and as a consequence a carbonaceous residue is left in the braze joint. This residue can inhibit the flow of the molten brazing alloy, resulting in an incompletely brazed or filled joint. A further disadvantage is that the organic-bonded powder form of alloy undergoes a reduction in volume during the brazing process which renders such alloys unsuitable for applications requiring precise prepositioning of the parts to be joined.

An object of this invention is the provision of a method for making an extremely hard and brittle brazing alloy into a homogeneous solid strip or sheet form that is substantially pure, i.e., contains no bonding or carrier vehicle.

Another object is the provision of a method of making such brazing alloys to precisely controlled dimensions.

A further object is the provision of a method of making such brazing alloys rapidly and continuously and therefore at low cost.

SUMMARY OF THE INVENTION

The invention consists of applying temporarily to a substrate a paste made of a vehicle and a powdered metallic substance such as a pure alloy, melting the pure alloy to form a homogeneous layer, and finally separating the substrate from the alloy to leave the latter as a solid strip or sheet from which brazing inserts may be formed.

DESCRIPTION OF THE DRAWING

The Drawing illustrates schematically apparatus for practicing the method embodying the invention.

DESCRIPTION OF PREFERRED EMBODIMENT

Referring now to the drawings, there is shown a supply roll 10 of a thin substrate material 11 such as low carbon steel ribbon which is fed from the roll under a hopper 12 having a discharge opening 13 adjacent to the upper surface of the substrate. Hopper 12 contains a paste made from a powdered brazing alloy such as AMS 4779 and a suitable vehicle such as polyvinylbutyrate; the paste is fed by gravity or otherwise through opening 13 onto the upper surface substrate 11 and is formed into a layer 14 by a spreader blade 15 on hopper 12 to any desired and uniform thickness, for example 0.010 inches, as the substrate moves under the hopper.

Substrate 11 together with the layer 14 of paste then passes through a heat chamber or drier 17 which slowly drives off from the alloy layer the solvent portion of the organic vehicle while leaving the balance of that vehicle. The substrate and alloy layer then move into a preheat furnace 18 operating at a temperature sufficient to drive off the organic vehicle from layer 14. Thus layer 14a at the exit end of the preheat furnace 18 consists of the pure brazing alloy in granular form with the granules lightly adhering to each other. The uniformity of thickness of layer 14a is substantially unchanged although the thickness is somewhat reduced.

The substrate and alloy layer next move into a melting furnace 19 operating at a temperature which is above the melting temperature of the brazing alloy but below the melting temperature of the substrate. By way of example, for a brazing alloy such as AMS 4779 and a substrate of low carbon steel, the operating temperature of furnace 19 would be approximately 2,000° to 2,050° F. While the substrate and alloy layer are within furnace 19, the powder which comprises layer 14a melts to form a homogeneous mass of the pure brazing alloy. Both the operating temperature of the furnace 19 and time that the substrate and alloy layer are within the furnace are precisely controlled to insure that the alloy powder is uniformly melted and to minimize its reaction with the substrate. The substrate and alloy layer then move through a cooling chamber 20 in which they reach room temperature.

The alloy layer and substrate are next passed through an etching tank 22 which contains a chemical solution 23 in which substrate 11 is soluble but which does not affect alloy layer 14a. As the substrate is dissolved in the etching tank, the alloy layer remains as a self-supporting continuous strip 14b. After emerging from the etching tank, layer 14b is successively rinsed in chamber 25 and dried in drier 26 and thereafter is wound on a storage roll 28. The alloy may be further processed into various shapes and sizes by blanking or otherwise forming brazing inserts from the alloy strip 14b of roll 28.

By use of the foregoing method extremely brittle metallic substances including alloys which are not readily reduced by rolling or stamping are formed into a uniformly thick, self-supporting homogeneous mass containing no contaminants or other undesirable elements. Brazing inserts made from strip 14b may be easily handled and precisely formed for use in metal joints having fixed dimensions. The thickness of the brazing strip is readily changed if desired by varying the position of blade 15 at hopper 12.

By way of example, a process embodying this invention and having the following characteristics and parameters have been used in successfully producing the identified brittle brazing alloy in strip form:

| | |
|---|---|
| Brazing alloy | |
|    Material | AMS 4779 |
|    Thickness, layer 14b | 0.003" |
|    Melting temperature | 1950°F. |
| Substrate | |
|    Material | carbon steel |
|    Thickness | 0.001" |
|    Width | 3¼" |
| Organic vehicle | polyvinyl-butyrate |
| Operating temperature | |
|    Drier 17 | 150°F. |

| | |
|---|---|
| Preheat furnace 18 | 800°F. |
| Melting furnace 19 | 2000°F. |
| Etching solution | hydrochloric acid |

The foregoing process may be employed with utility and advantage to other brittle metallic substances including, without limitation, the series of nickel, chromium, boron and silicon alloys with varying percentages of these elements. Variations of such alloys have additions of molybdenum, titanium, tungsten, iron, palladium, manganese and cobalt. Other brittle alloys that are candidates for the process embodying the invention are 80 percent (by weight) gold and 20 percent tin; and 70–80 percent gold, balance indium.

We claim:

1. The method of making a brittle alloy in pure sheet form consisting of the steps of mixing said alloy in powdered form with a vehicle to make a paste, applying said paste as a layer to a substrate, removing the vehicle from said layer, melting the layer uniformly into a homogeneous mass without melting the substrate and thereafter cooling same to solidify it into a self-supporting sheet, and removing said substrate from the alloy sheet.

2. The method according to claim 1 in which the length of time that the layer is melted is sufficient to permit the alloy to flow while minimizing reaction of the alloy with the substrate.

3. The method according to claim 1 in which said substrate is chemically removed from the alloy sheet by dissolving the substrate in a solution which does not affect the alloy sheet.

* * * * *